United States Patent
Inoue et al.

(10) Patent No.: US 7,180,521 B2
(45) Date of Patent: Feb. 20, 2007

(54) METHOD AND DEVICE FOR ACCESSING FRAME MEMORY WITHIN DISPLAY PANEL DRIVER

(75) Inventors: Toshiaki Inoue, Tokyo (JP); Katsuyuki Hashimoto, Inagi (JP)

(73) Assignee: Pioneer Corporation, Tokyo (JP)

( * ) Notice: Subject to any disclaimer, the term of this patent is extended or adjusted under 35 U.S.C. 154(b) by 49 days.

(21) Appl. No.: 10/713,005

(22) Filed: Nov. 17, 2003

(65) Prior Publication Data

US 2004/0095356 A1    May 20, 2004

(30) Foreign Application Priority Data

Nov. 15, 2002   (JP)   ............... 2002-332949

(51) Int. Cl.
G09G 5/39    (2006.01)
G09G 5/36    (2006.01)
G06F 13/28   (2006.01)

(52) U.S. Cl. .................. 345/531; 345/545; 345/533
(58) Field of Classification Search ................ 345/531, 345/533, 539, 545, 690–694, 60, 204
See application file for complete search history.

(56) References Cited

U.S. PATENT DOCUMENTS 6,335,728 B1 *  1/2002  Kida et al. .................. 345/204

6,876,395 B1 *  4/2005  Muto et al. .................. 348/441

FOREIGN PATENT DOCUMENTS

| JP | 5-303477 | 11/1993 |
|---|---|---|
| JP | 8-76713 | 3/1996 |
| JP | 8-194451 | 7/1996 |
| JP | 10-260667 | 9/1998 |
| JP | 10-268833 | 10/1998 |
| JP | 11-175024 | 7/1999 |
| JP | 2001-215934 | 8/2001 |

* cited by examiner

Primary Examiner—Kee M. Tung
Assistant Examiner—Hau Nguyen
(74) Attorney, Agent, or Firm—Drinker Biddle & Reath LLP

(57) ABSTRACT

A method for accessing a frame memory integrated within a display panel driver driving a display panel is composed of serially performing write operations for writing sub-field data of a pixel line within the display panel for a plurality of sub-fields into the frame memory, and serially performing read operations for reading sub-field data of a plurality of pixel lines for a sub-field from the frame memory. At least two of the write operations are allowed to be performed between adjacent two of the read operations.

9 Claims, 13 Drawing Sheets

Fig. 2A PRIOR ART — BANK #1

| ROW / COLUMN | 0 — 127 | 128 — 255 |
|---|---|---|
| 0 | LINE 1 (SF1) | LINE 2 (SF1) |
| | SF1 | |
| 191 | LINE 765 (SF1) | LINE 766 (SF1) |
| 192 | LINE 1 (SF2) | LINE 2 (SF2) |
| | SF2 | |
| 383 | | |
| 384 — 575 | SF3 | |
| 576 — 767 | SF4 | |
| 768 — 959 | SF5 | |
| 960 — 1151 | SF6 | |
| 1152 — 1343 | SF7 | |
| 1344 — 1535 | SF8 | |
| 1536 — 1727 | SF9 | |
| 1728 — 1919 | SF10 | |
| 1920 — 2111 | SF11 | |
| 2112 — 2303 | SF12 | |
| 2304 — 2495 | SF13 | |
| 2496 — 2687 | SF14 | |
| 2688 — 2879 | SF15 | |
| 2880 — 3070 | SF16 | |
| 3071 | LINE 765 (SF16) | LINE 766 (SF16) |
| 3072 — 4095 | NOT IN USE | |

(COLUMN 31 indicated at top)

Fig. 2B PRIOR ART — BANK #2

| ROW / COLUMN | 0 — 127 | 128 — 255 |
|---|---|---|
| 0 | LINE 3 (SF1) | LINE 4 (SF1) |
| | SF1 | |
| 191 | LINE 767 (SF1) | LINE 768 (SF1) |
| 192 | LINE 3 (SF2) | LINE 4 (SF2) |
| | SF2 | |
| 383 | | |
| 384 — 575 | SF3 | |
| 576 — 767 | SF4 | |
| 768 — 959 | SF5 | |
| 960 — 1151 | SF6 | |
| 1152 — 1343 | SF7 | |
| 1344 — 1535 | SF8 | |
| 1536 — 1727 | SF9 | |
| 1728 — 1919 | SF10 | |
| 1920 — 2111 | SF11 | |
| 2112 — 2303 | SF12 | |
| 2304 — 2495 | SF13 | |
| 2496 — 2687 | SF14 | |
| 2688 — 2879 | SF15 | |
| 2880 — 3070 | SF16 | |
| 3071 | LINE 767 (SF16) | LINE 768 (SF16) |
| 3072 — 4095 | NOT IN USE | |

ODD-NUMBERED FRAME

Fig. 2C PRIOR ART
BANK #3

| Line | 0 — 127 | 128 — 255 |
|---|---|---|
| 0 – 191 | SF1 | |
| 192 – 383 | SF2 | |
| 384 – 575 | SF3 | |
| 576 – 767 | SF4 | |
| 768 – 959 | SF5 | |
| 960 – 1151 | SF6 | |
| 1152 – 1343 | SF7 | |
| 1344 – 1535 | SF8 | |
| 1536 – 1727 | SF9 | |
| 1728 – 1919 | SF10 | |
| 1920 – 2111 | SF11 | |
| 2112 – 2303 | SF12 | |
| 2304 – 2495 | SF13 | |
| 2496 – 2687 | SF14 | |
| 2688 – 2879 | SF15 | |
| 2880 – 3071 | SF16 | |
| 3071 | LINE 765 (SF16) | LINE 766 (SF16) |
| 3072 – 4095 | NOT IN USE | |

Fig. 2D PRIOR ART
BANK #4

| Line | 0 — 127 | 128 — 255 |
|---|---|---|
| 0 – 191 | SF1 | |
| 192 – 383 | SF2 | |
| 384 – 575 | SF3 | |
| 576 – 767 | SF4 | |
| 768 – 959 | SF5 | |
| 960 – 1151 | SF6 | |
| 1152 – 1343 | SF7 | |
| 1344 – 1535 | SF8 | |
| 1536 – 1727 | SF9 | |
| 1728 – 1919 | SF10 | |
| 1920 – 2111 | SF11 | |
| 2112 – 2303 | SF12 | |
| 2304 – 2495 | SF13 | |
| 2496 – 2687 | SF14 | |
| 2688 – 2879 | SF15 | |
| 2880 – 3071 | SF16 | |
| 3071 | LINE 767 (SF16) | LINE 768 (SF16) |
| 3072 – 4095 | NOT IN USE | |

EVEN-NUMBERED FRAME

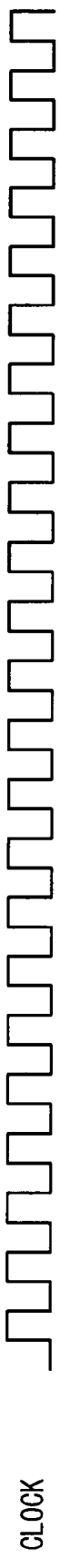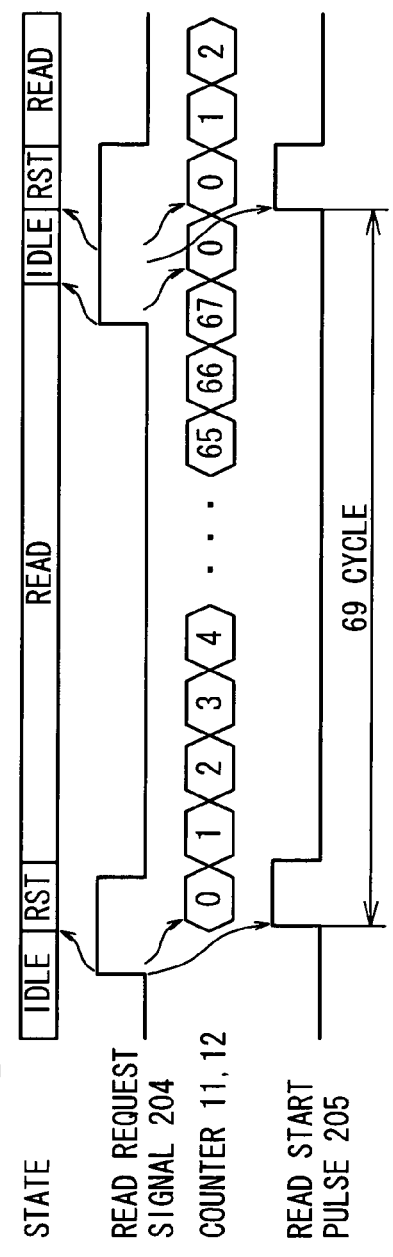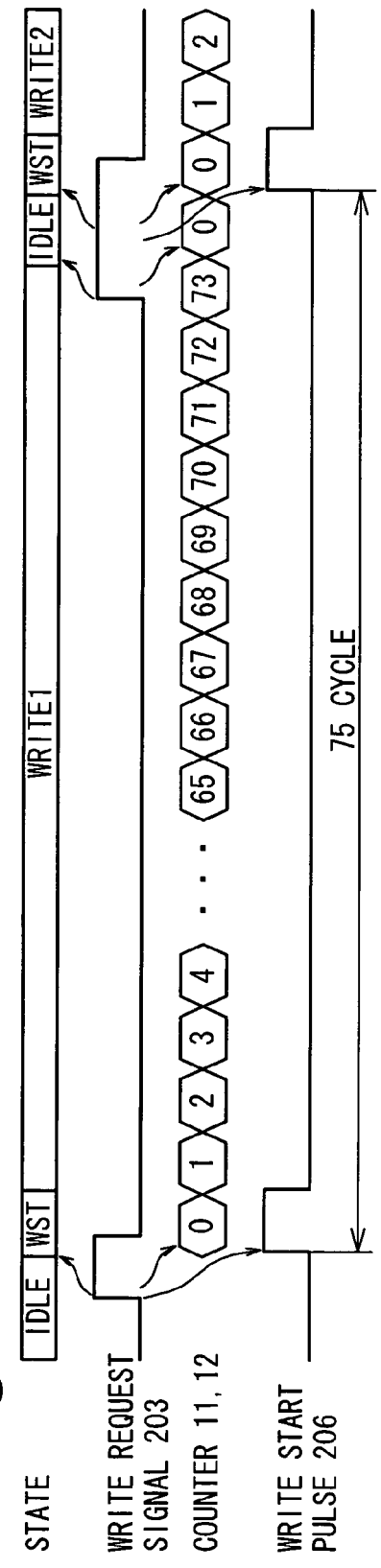

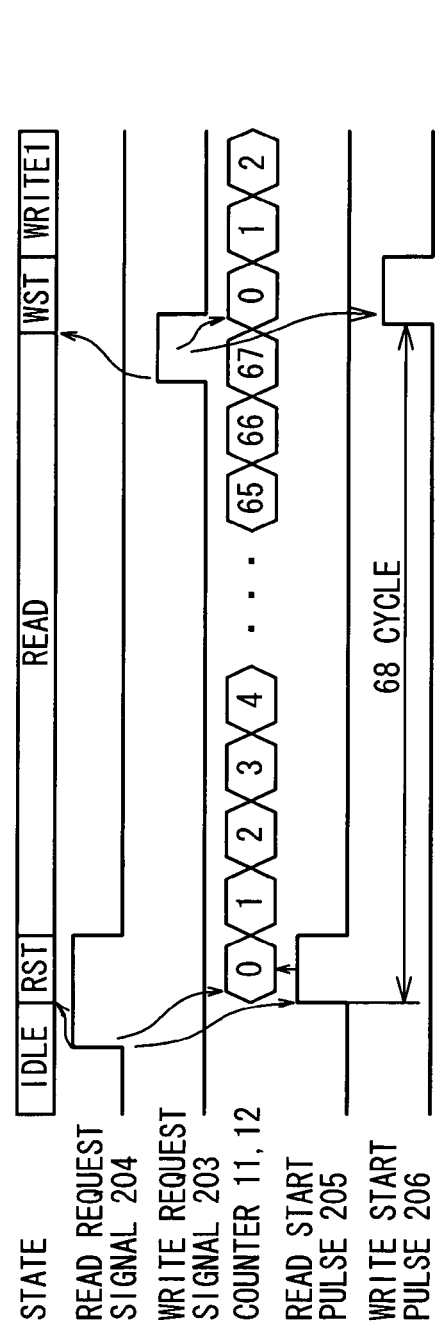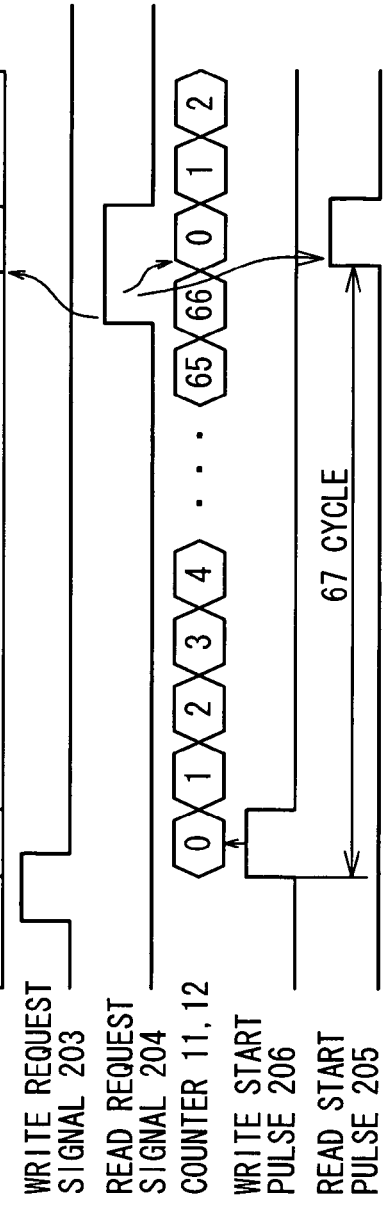

Fig. 8G
Fig. 8H
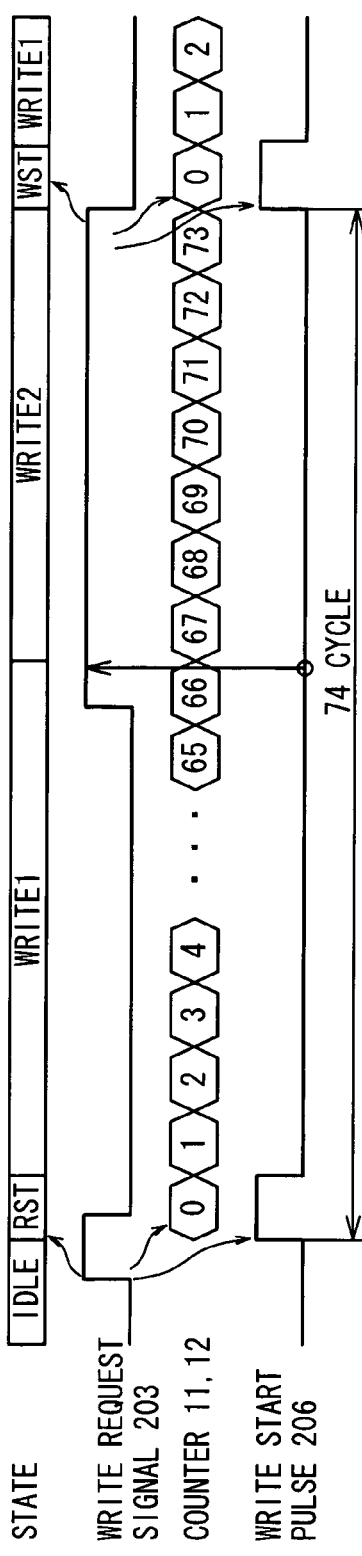
Fig. 8I
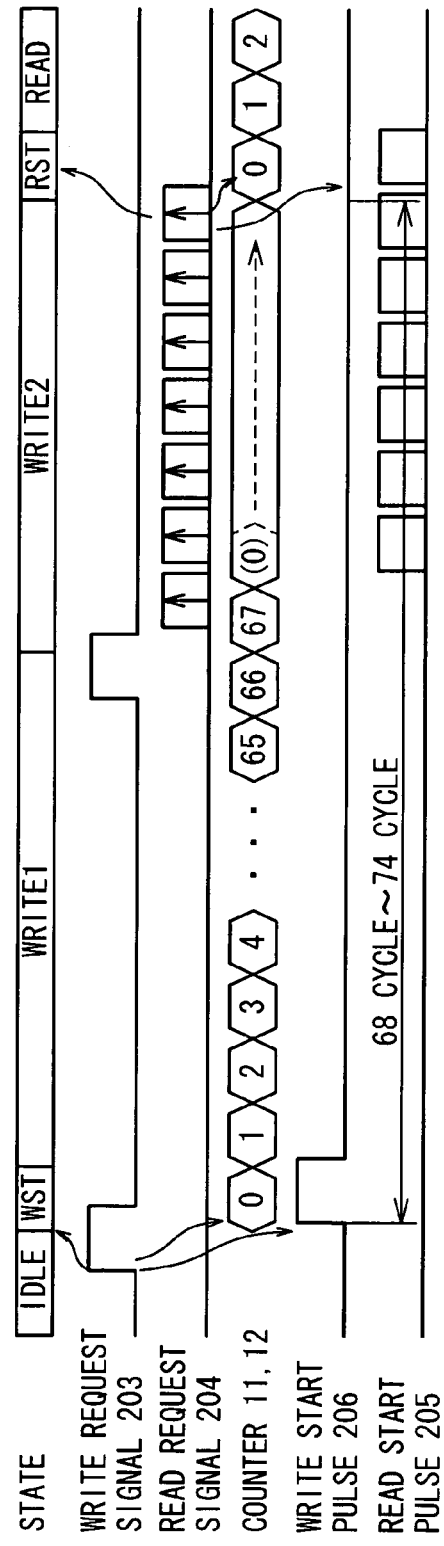

METHOD AND DEVICE FOR ACCESSING FRAME MEMORY WITHIN DISPLAY PANEL DRIVER

BACKGROUND OF THE INVENTION

1. Field of the Invention

The present invention is generally related to a method and device for accessing a frame memory, particularly, to an accessing technique of a frame memory integrated within a display panel driver adopting a sub-field addressing method.

2. Description of the Related Art

The sub-field addressing method is a typical drive sequence for achieving a gray scale in pixels of a plasma display panel. The sub-field addressing method divides each frame into a plurality of sub-fields, and each of the sub-fields is further divided into an address period and a sustain period. Each pixel is activated or turned on during the sustain period(s) of one or more selected sub-fields in response to the intensity thereof, and this selective activation achieves a gray scale in each pixel. In order to emit light from a given pixel site during a given sub-field, the pixel site is selected to receive a write address pulse during the associated address period, and a sustain voltage is applied to the selected pixel site to cause an emission of light therefrom during the associated sustain period.

FIG. 1 shows a drive sequence to achieve a 16 gray scale using a sub-field addressing method. The drive sequence divides each frame into four sub-fields SF1 to SF4. The length of each of the four sub-fields is different. The first sub-field SF1 has a sustain period with eight sustain cycles, each corresponding to a sustain pulse, the second sub-field has four sustain cycles, the third sub-field has two sustain cycles, and the fourth sub-field has a sustain period with only one complete sustain cycle. The pixel site is activated during one or more of the sub-fields SF1 to SF4 selected in response to the intensity or the gray scale level of the pixel site to achieve a 16 ($=2^4$) gray scale. The number of available gray scale levels increases as an increase in the number of the sub-fields. In order to achieve a 256 gray scale, a frame is necessary to include eight sub-fields.

Implementing a sub-field addressing method requires appropriate allocation of sub-field data of each sub-field in a frame memory disposed within a display driver, where the sub-field data is representative of illumination or extinction of each pixel during each sub-field. FIG. 2A to FIG. 2D illustrates an exemplary memory map of a frame memory adapted for the sub-field addressing method. The frame memory stores image data for two frames to achieve a double buffering technique. This requires the frame memory to have a memory capacity more than 96 Mbits for driving a display panel in accordance with the full color WXGA (wide extended graphics array) specification, which involves 1365×768 pixels with a 16 bit data word for each pixel. It should be noted that each line within the panel includes 1365 pixels, and the intensity of each pixel is represented by 16 data bits.

In order to satisfy this requirement, the frame memory includes a 128 Mbit synchronous dynamic random access memory with four 32 Mbit banks #1 to #4. The banks #1 and #2 are used for storing image data of odd-numbered frames, while the banks #3 and #3 are used for storing image data of even-numbered frames. Each of the banks #1 to #4 is organized as 4,096 rows by 256 columns by 32 bits. This means that each row within the banks has a capacity for storing sub-field data of two lines of pixels, and storing a complete set of sub-field data for a frame requires 192 rows in each of the two banks associated with the frame. Each banks includes 16 regions, which are respectively associated with 16 sub-fields. The row addresses over 3072 are not in use for the WXGA specification.

Write and read operations of the frame memory usually adopt different access sequences. The write operation into the frame memory is implemented in units of pixel lines, while the read operation is implemented in units of sub-fields. For the frame memory shown in FIGS. 2A through 2D, for example, the write operation begins with a sequential write of sub-field data of the 1st line for 1st through 16th sub-fields in the order of the sub-field number. A sequential write of sub-field data of the 2nd line then follows, a sequential write of sub-field data of the 3rd line then follows, and so force, until a sequential write of sub-field data of the 768th line is completed. The read operation, on the other hand, begins with a sequential read of sub-field data of the 1st through 768th lines for the 1st sub-field. A sequential read for the 2nd sub-field then follows, a sequential read for the 3rd sub-field then follows, and so force, until the sequential read for the 16th sub-fields is completed.

FIG. 3 shows an exemplary access sequence of the frame memory shown in FIGS. 2A through 2D. FIG. 3 refers to symbols "Rd" and "Wr" as read and write operations of sub-field data of a certain line for a certain sub-field, respectively. Write sub-field data 902 of the 1st line for the 1st through 16th sub-fields are serially inputted to the frame memory in synchronization with a write horizontal sync signal 901, while read sub-field data 904 of the 1st through 16th lines for the 1st sub-fields are serially outputted from the frame memory in synchronization with a read horizontal sync signal 903. The read and write operations for the read and write sub-field data are alternately performed in synchronization with the read horizontal sync signal 903.

The access sequence shown in FIG. 3 has an advantage that it requires only a single port for a frame memory to exchange write and read sub-field data, that is, eliminates necessity for providing separated write and read ports within a frame memory. This advantageously reduces cost of frame memories.

Another advantage of the access sequence is its simplicity, and this feature ensures write and read operations of sub-field data for a given frame in the associated frame time.

Display drivers are desirably designed to allow the numbers of sub-fields of write and read image data to be independently adjustable, because this promotes the use of the same display driver for driving different display panels, and thereby reduces cost of display drivers through a mass production effect. This requirement has been enhanced by an increase in the number of sub-fields within a frame for improving image quality.

In addition, display drivers are desirably designed to achieve fast write operation to frame memories integrated therein. The aforementioned method and system suffer from a drawback that the write cycle time is restricted by the read cycle time, which is determined by the frame rate or the frame time.

3. Prior Art Documents

Japanese Unexamined Patent Application No. Jp-A 2001-215934 discloses a display driver for allowing users to select a desired image from among inputted images and to quickly switch images without causing deterioration of the images.

Japanese Unexamined Patent Application No. Ja-A-Heisei 10-260677 discloses a technique for allowing a display driver adopting a double buffer architecture to display a static image on the display screen without using special controller circuit. The display driver includes a pair of frame memories and a switching circuitry to achieve a double buffer technique. For displaying a static memory, the display driver disables the switching circuitry and reads out the same image data from selected one of the frame memories.

Japanese Unexamined Patent Application No. Jp-A-Heisei 10-268833 discloses a method and system for achieving fine resolution and gray scale without using a high speed frame memory. The method and system rearranges a bit frame in response to pixel positions and firing timings, and stores the rearranged bit frame into a plurality of frame memories so that the system are allowed to obtain the bit frame at a single read cycle. This effectively eliminates the necessity for using a high speed memory device as the frame memory.

Japanese Unexamined Patent Application No. Jp-A-Heisei 11-175024 discloses a plasma display system for achieving fine resolution and gray scale without using a high speed frame memory. Bit frames are allocated and stored into a frame memory in response to the positions of pixels associated therewith, and a dual port memory is used as the frame memory. This allows the frame memory to provide address drivers with address data without reordering. This effectively eliminates the necessity for using a high speed memory device as the frame memory.

Japanese Unexamined Patent Application No. Jp-A Heisei 8-194451 discloses an LCD (liquid crystal display) driver using a multi-line selection method (MLS method) for calculating a column line voltage in a short time with a low-speed DRAM. The disclosed LCD driver includes a pair of frame memories, one storing odd-numbered bit frames, and the other storing even-numbered bit frames. The associated pair of bit frames are successively transferred to from the frame memory to a column voltage calculating circuit.

Japanese Unexamined Patent Application No. Jp-A-Heisei 8-76713 discloses a technique for driving an electroluminescent display or a liquid crystal displays with a CRT (cathode ray tube) controller. The technique divides a display screen into a pair of regions. One of the regions is driven in response to image data received from a video memory. Image data for the remaining regions are transferred to associated frame memories, and remaining regions are driven in response to image data received from the frame memories.

Japanese Unexamined Patent Application No. Jp-A-Heisei 5-303477 discloses a display control system for reducing the time required for reading out data as less as possible while maintaining the extensibility of the system by previously storing the arrangement information of addresses for data required for processing.

SUMMARY OF THE INVENTION

An object of the present invention is to provide a display driver designed to allow the numbers of sub-fields of write and read image data to be independently adjustable.

Another object of the present invention is to provide a display driver designed to achieve fast write operation to a frame memory integrated therein.

In an aspect of the present invention, a method for accessing a frame memory integrated within a display panel driver driving a display panel, the method is composed of:

serially performing write operations for writing sub-field data of a pixel line within the display panel for a plurality of sub-fields into the frame memory; and serially performing read operations for reading sub-field data of a plurality of pixel lines for a sub-field from the frame memory;

at least two of the write operations being allowed to be performed between adjacent two of the read operations. It should be noted that the sub-field data of a given pixel line for a given designates data representative of illumination or extinction of each pixel included in the given pixel line during the given sub-field.

The method preferably further including:

providing first and second horizontal sync signals;

the write operations for writing the sub-field data of the pixel line for the plurality of sub-fields being performed during a single cycle of the first horizontal sync signal; and each of the read operations for reading the sub-field data of the pixel line for each of the plurality of sub-fields being performed during a single cycle of the second horizontal sync signal.

Preferably, in response to activation of the read request signal, one of the read operations associated with the activation is performed immediately after the activation of the read request signal when the frame memory is not engaged in write operation, while the associated one of the read operations is performed after completion of associated one of the write operations when the frame memory is engaged in the associated one of the write operations.

In this case, the read request signal is preferably kept activated until the associated one of the read operations is initiated.

Preferably, in response to activation of the write request signal, one of the write operations associated with the activation is performed immediately after the activation of the write request signal when the frame memory is not engaged in read nor write operation, the associated one of the write operations is performed after completion of associated one of the read operations when the frame memory is engaged in the associated one of the read operations, and the associated one of the write operations is performed after completion of previous one of the write operations when the frame memory is engaged in the previous one of the write operations.

In this case, the write request signal is preferably kept activated until the associated one of the write operations is initiated.

In another aspect of the present invention, a memory controller for controlling access to a frame memory is composed of a timing controller developing read and write start pulse signals in response to write and read request signals, and a read/write operation control unit responsive to the read and write start pulse signals for initiating read operations for reading sub-field data from the frame memory, and write operations for write sub-field data into the frame memory. The timing controller develops the read and write start pulse signals to allow the read/write operation control unit to initiate at least two of the write operations between adjacent two of the read operations.

The timing controller preferably includes a state machine switching a state of the frame memory among a plurality of states in response to a reset signal, the write and read request signals, the plurality of states including an idle state, a write start state, a first write operation state, and a second write operation state. The state machine is designed to switch the state of the frame memory to the idle state in response to activation of the reset signal, to switch the state of the frame memory to the write start state in response to first activation of the write request signal, to unconditionally switch the state of the frame memory to the first write operation state after placing the frame memory in the write start state to initiate one of the write operations, and to switch the state of the frame memory to the second write operation state in response to second activation of the write request signal during the one of the write operations to initiate next one of the write operations.

When the plurality of states further includes a read start state, and a read operation state, the state machine is preferably designed to switch the state of the read start state in response to activation of the read request signal when the frame memory is placed in any of the idle state and the first and second write operation states, and to unconditionally switch the state of the frame memory to the read operation state after placing the frame memory in the read start state to initiate one of the read operations.

BRIEF DESCRIPTION OF THE DRAWINGS

FIGS. 2A through 2D are memory maps of a conventional frame memory adapted to the conventional sub-field addressing method;

FIGS. 8A through 8I are timing charts illustrating read and write operations of sub-field data of a certain pixel line for a certain sub-field, achieved through the state transition illustrated in FIG. 7;

DESCRIPTION OF THE PREFERRED EMBODIMENTS

Preferred embodiments of the present invention are described below in detail with reference to the attached drawings.

Figure 1:
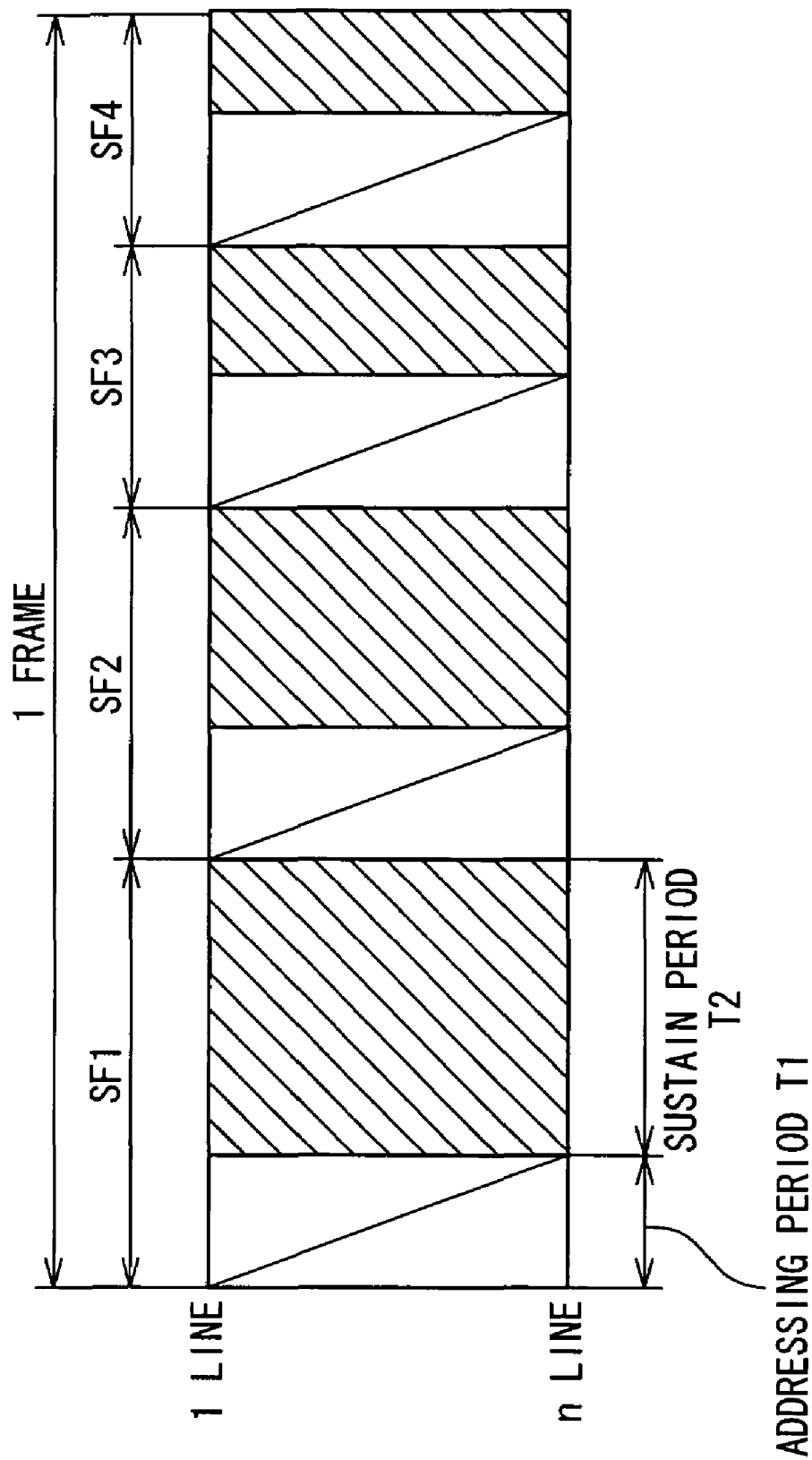
FIG. 1 is a diagram illustrating a conventional sub-field addressing method for achieving a gray scale.
Figure 3:
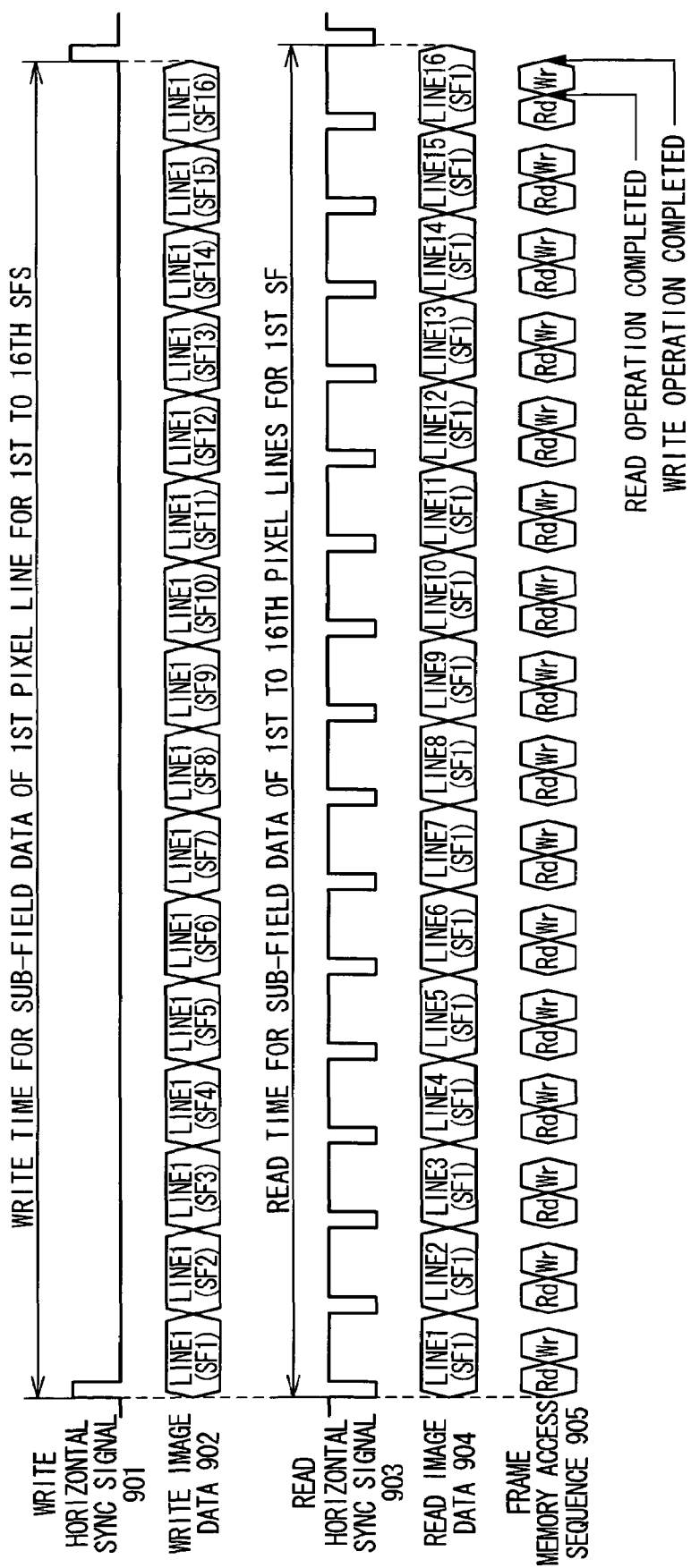
FIG. 3 is a timing chart illustrating a conventional method for accessing a frame memory.
Figure 4:
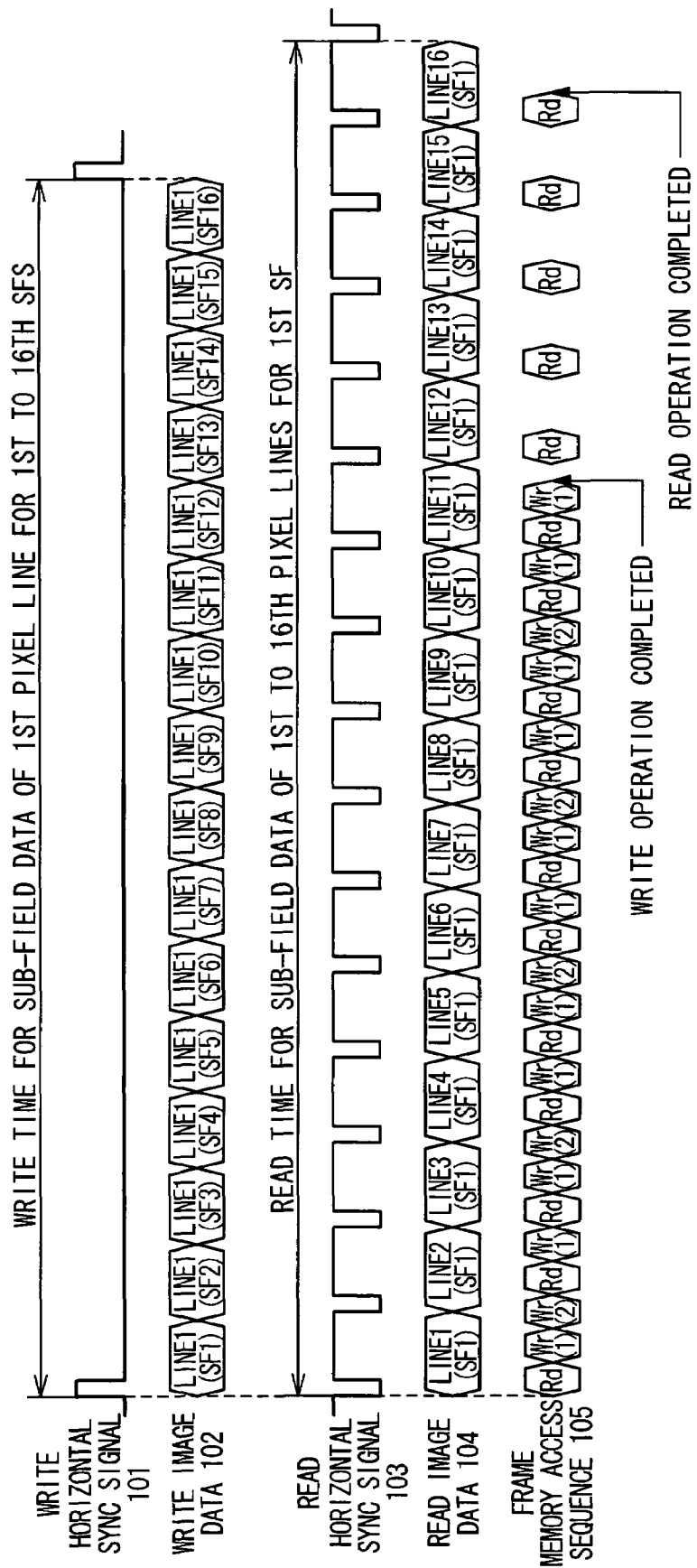
FIG. 4 is a timing chart illustrating a method for accessing a frame memory in one embodiment of the present invention.

FIG. 4 shows a procedure of accessing a frame memory in one embodiment of the present invention. The frame memory interfaces a signal processor generating desired image data, and a data line driver driving data lines of a display panel in response to the image data. The frame memory in this embodiment has the same structure and map allocation as that described with reference to FIGS. 2A through 2D. The display panel includes 768 pixel lines in an direction orthogonal to the data lines to satisfy a WXGA specification.

The image data received from the signal processor is referred to as a write image data 102, and the image data transmitted to the data driver is referred to as a read image data 104. The write and read image data 102 and 104 include sub-field data of each pixel line for each sub-field, each of which is represented by a hexagon in FIG. 4. The sub-field data within the write image data 102 may be referred to as write sub-field data, while the sub-field data within the read image data 104 may be referred to as read sub-field data.

The frame memory receives a pair of horizontal sync signals from the signal processor and the display panel, and the one from the signal processor is referred to as a write horizontal sync signal 101, and the other is referred to as a read horizontal sync signal 103. Write operation of the write image data 102 into the frame memory is synchronous with the write horizontal sync signal 101. The cycle of the write horizontal sync signal 101 is determined by the frame time and the number of pixel lines of the display panel.

The write operation of the write sub-field data is achieved in unit of pixel lines. In detail, sub-field data of the 1st pixel line for the 1st through 16th sub-fields are serially inputted to the frame memory, and a serial write operation of the sub-field data of the 2nd pixel line for the 1st through 16th sub-fields then follows. The same goes for the remaining pixel lines, until the write operation of sub-field data of the 768th pixel line is completed.

By contrast, the read operation of the read image data 104 is achieved in unit of sub-fields. Sub-field data of the 1st to 768th pixel lines for the 1st sub-field are serially outputted from the frame memory, and a serial read operation of the sub-field data for the 2nd sub-field then follows, and so force, until the sub-field data for the 14th sub-field is completed. The read operation of sub-field data is performed in response to the activation of the read horizontal sync signal 103.

In this embodiment, the signal processor establishes 16 sub-fields within a frame, while the data line driver establishes 14 sub-fields within a frame. In other words, the write image data 102 includes 16 sub-field data for one frame, while the read image data 104 includes 14 sub-fields data for the frame. The difference in the number of the sub-fields requires the frame memory to receive from the signal processor sub-field data more than those outputted to the data line driver in each frame.

In order to achieve this requirement, the access sequence is adapted to perform write operation of write sub-field data for one or more sub-fields between read operations adjacent in time in response to the length of idle time therebetween, as indicated by symbols "Rd", "Wr(1)", and "Wr(2)" in FIG. 4, where the symbols "Rd" represent the read operations while the symbols "Wr(1)", and "Wr(2)" represent the write operations. In the event that the read horizontal sync signal 103 is activated during a write operation, a read operation is initiated after the completion of the write operation.

Figure 5:
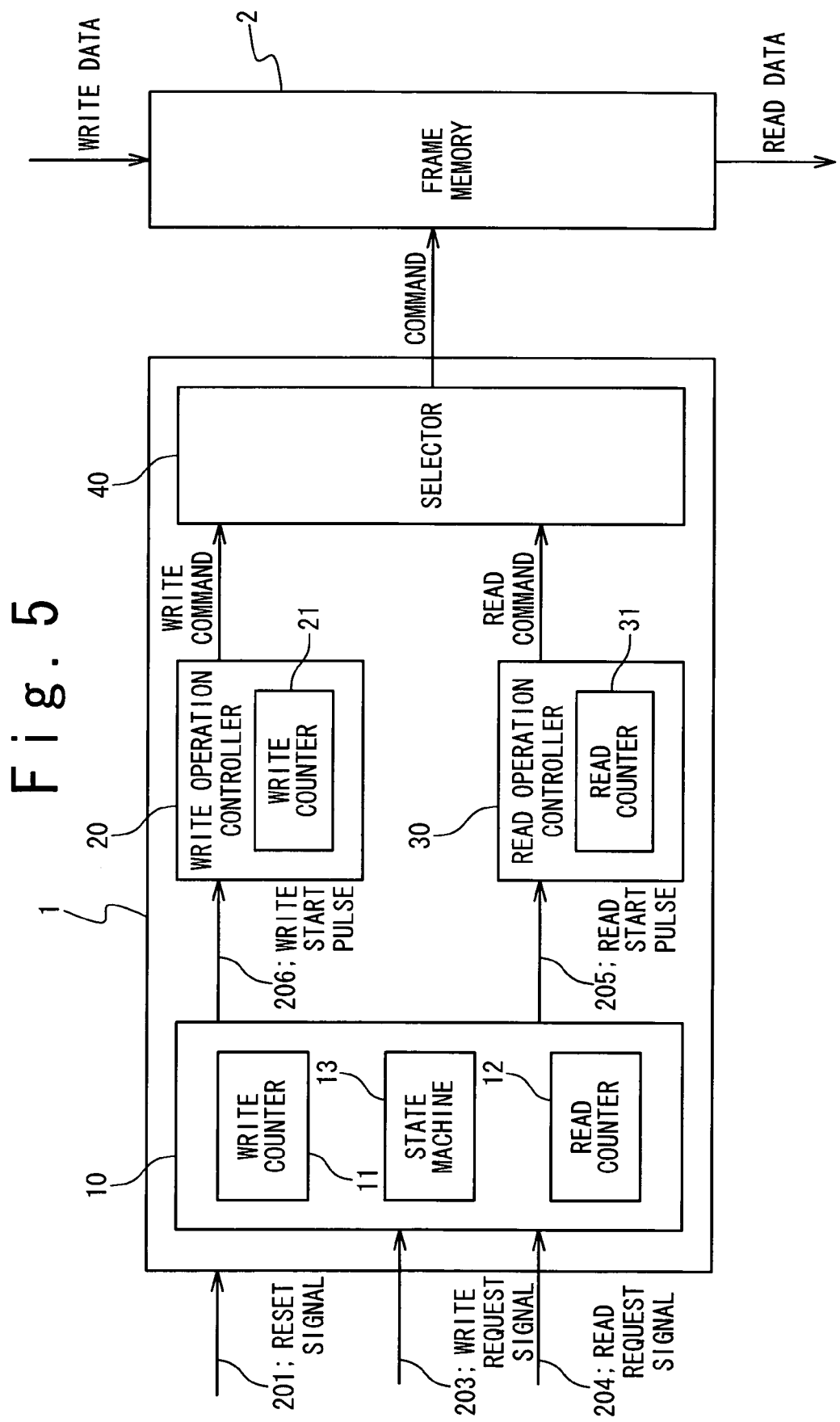
FIG. 5 is a block diagram of a memory controller used for implementing the method in the embodiment.

FIG. 5 shows a block diagram of a memory controller 1 for implementing the access sequence in this embodiment. The memory controller 1 is adapted to control accesses to the frame memory, which is denoted by a numeral "2" in FIG. 5. The memory controller 1 is composed of a timing controller 10, a write operation controller 20, a read operation controller 30, and a selector 40.

The timing controller 10 is responsive to a write request signal 203 from the signal processor (not shown), a read request signal 204 from the data line driver (not shown), and a reset signal 201 for developing write start pulse signal 206 and read start pulse signal 205. The write start pulse signal 206 determines the respective timings when write operations are performed, while the read start pulse signal 205 determines the timings when read operations are performed. The write request signal 203 is synchronous with the write horizontal sync signal 101, while the read request signal 204 is synchronous with the read horizontal sync signal 102.

Referring back to FIG. 5, the timing controller 10 includes a write counter 11, a read counter 12, and a state machine 13.

The write counter 11 counts clock pulses (not shown) to determine the timings when the write start pulse signal 206 is activated. Correspondingly, the read counter 12 counts the clock pulses to determine the timings when the read start pulse signal 205 is activated.

The state machine 13 controls state transition of the frame memory 2. The state machine 13 places the frame memory 2 in a state selected from among the group consisting of an idle state "IDLE", a read start state "RST", a read operation state "READ", a write start state "WST", first and second write operation states "WRITE1" and "WRITE2". The state machine 13 is reset in response to the activation of the reset signal 201 to place the frame memory 2 in the idle state "IDLE".

The write and read operation controllers 20, 30, and the selector 40 function as a control unit responsive to the read and write start pulse signals 205 and 206 for issuing commands which indicates the frame memory 2 to initiate read or write operations of sub-field data.

In detail, the write operation controller 20 is responsive to the write start pulse signal 206 for developing write commands. The write operation controller 20 includes a write counter 21 counting the clock pulses, and the write commands are issued in response to the number of the counts in the write counter 21.

The read operation controller 30 is responsive to the read start pulse signal 205 for developing read commands. The read operation controller 30 includes a read counter 31 counting the clock pulses, and the read commands are issued in response to the number of the counts in the read counter 21.

The write and read counters 21, and 31 are operated so that the numbers of the counts therein are respectively identical to those in the write and read counters 11, and 12 within the timing controller 10.

The selector 40 selects the write and read commands received from the write and read operation controllers 20 and 30. The selected commands are provided for the frame memory 2.

Figure 6:
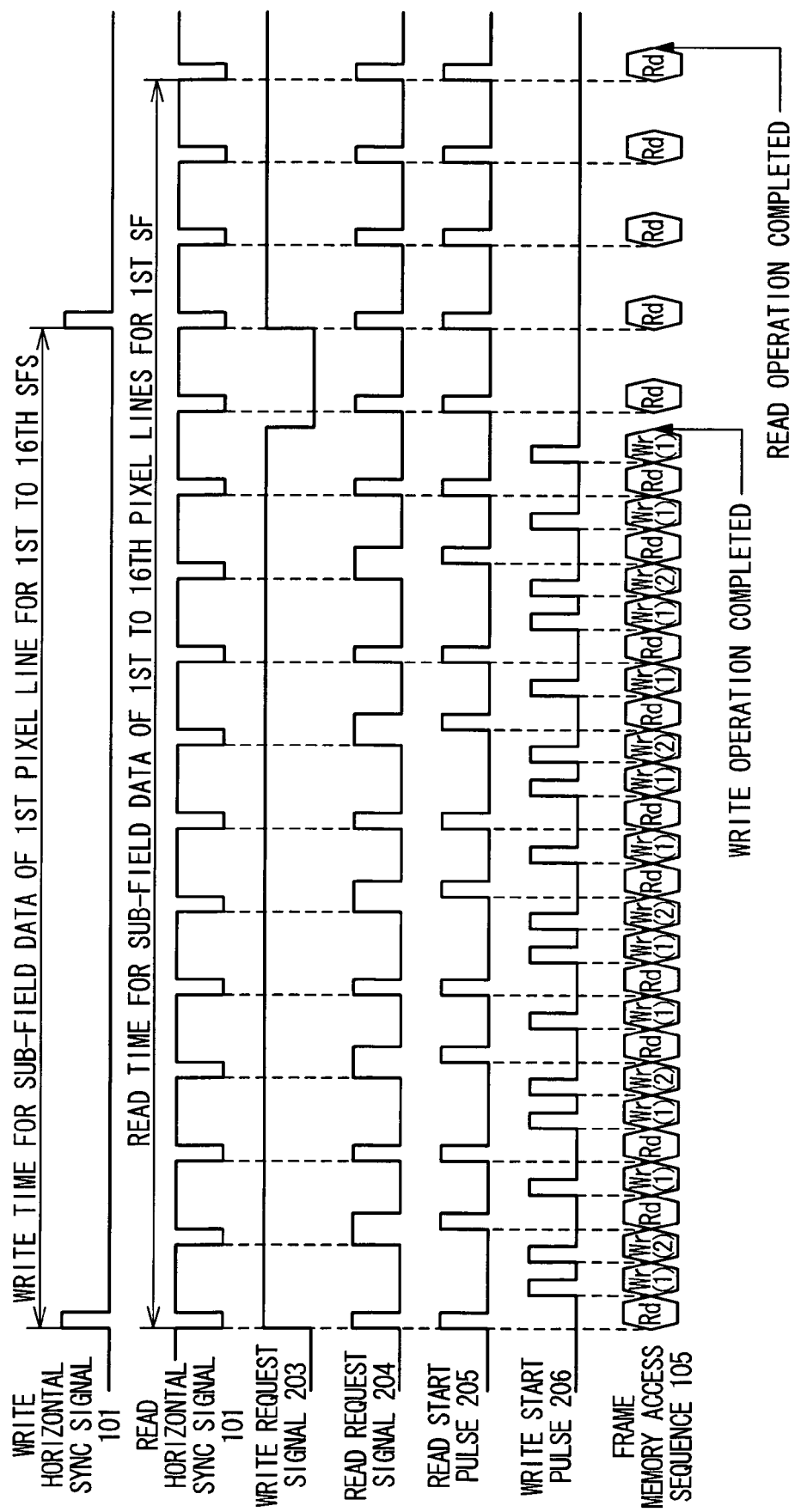
FIG. 6 is a timing chart illustrating operation of a timing controller within the memory controller.

FIG. 6 illustrates a timing chart of the operation of the memory controller 1.

The signal processor and the data line driver activate the write and read request signals 203, and 204 in synchronization with the write and read horizontal sync signals 201, and 202, respectively.

In response to the activation of the read request signal 204, the timing controller 10 determines whether the frame memory 2 is engaged in write or read operations. If not, the timing controller 10 activates the read start pulse signal 205 to initiate read operation. Otherwise, the timing controller 10 ignores the read request signal 204. This results in that the read request signal 204 is kept activated.

On the other hand, in response to the activation of the write request signal 203, the timing controller 10 determines whether frame memory 2 is engaged in write or read operations. If not, the timing controller 10 activates the write start pulse signal 205 to initiate write operation. Otherwise, the timing controller 1-ignores the write request signal 203. This results in that the write request signal 203 is kept activated.

The timing controller 10 is allowed to activate the read start pulse signal 205 once and to activate the write start pulse signal 205 once or twice, during a single cycle of the read horizontal sync signal 202. In an alternative embodiment, the timing controller 10 may be allowed to activate the write start pulse signal 205 three times or more.

Consequently, the timing controller 10 allows the frame memory 2 to perform one or more write operations in response to the activation of the write start pulse signal 205 between the adjacent read operations.

Figure 7:
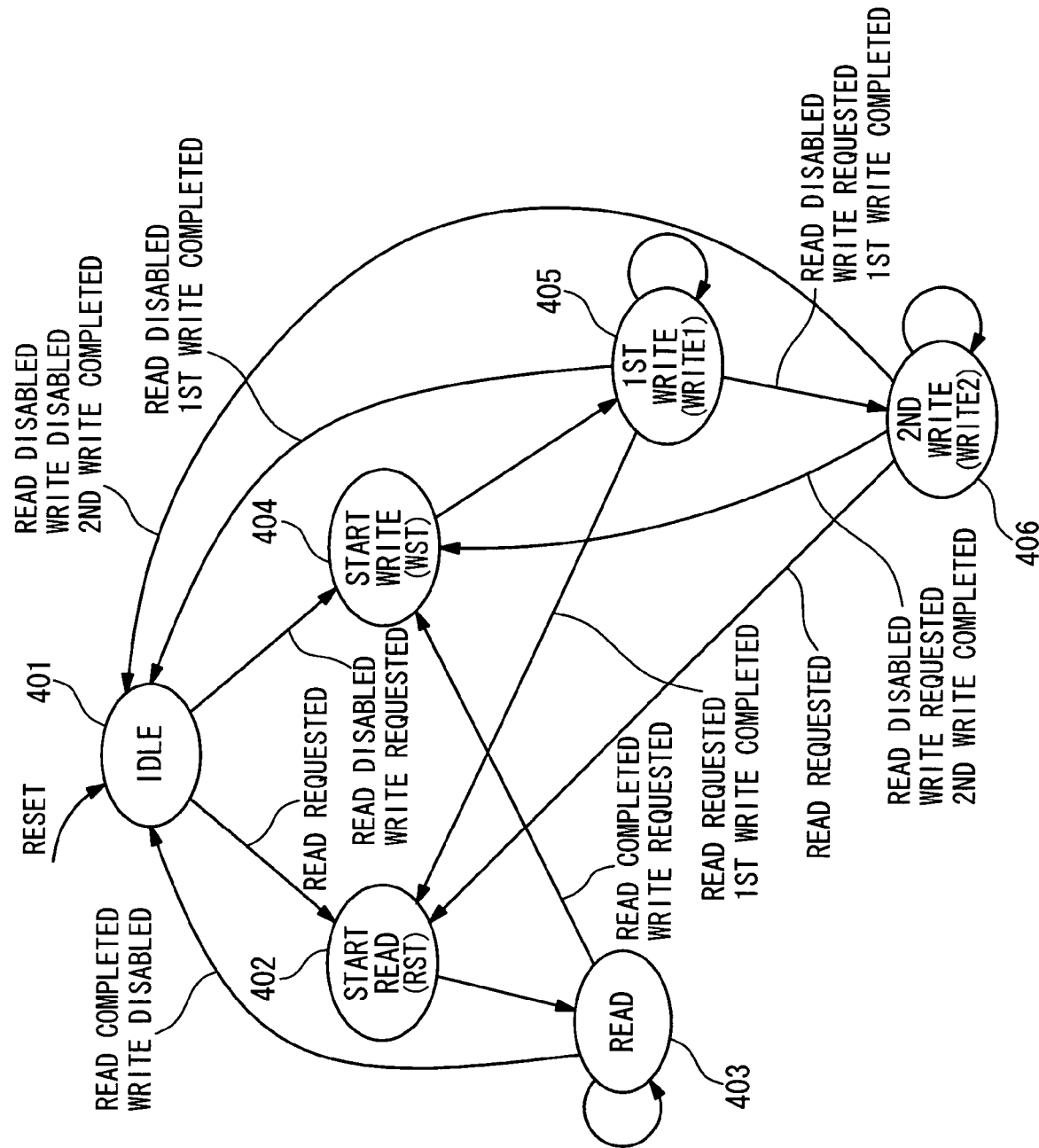
FIG. 7 is a diagram illustrating state transition of the frame memory achieved by a state machine within the timing controller.

The operation of FIG. 6 is achieved through the state transition control by the state machine 13. FIG. 7 shows a state transition diagram of the frame memory 2. As described before, the frame memory 2 is allowed to be placed in the idle state "IDLE", the read start state "RST", the read operation state "READ", the write start state "WST", the first and second write operation states "WRITE1" and "WRITE2".

Activation of the reset signal 201 resets the state machine 13 to place the frame memory 2 in the idle state "IDLE".

In response to the read request, that is, the activation of the read request signal 204, the state of the frame memory 2 is switched to the read start state "RST" to initiate read operation. The state of the frame memory 2 is then unconditionally switched to the read operation state "READ" to perform read operation.

If the write request is not issued during the read operation, that is, if the write request signal 203 is kept deactivated, the state of the frame memory 2 is switched to the idle state "IDLE" in response to the completion of the read operation. If the write request is issued during the read operation, the state of the frame memory 2 is switched to the write start state "WST" to initiate the first write operation.

The state of the frame memory 2 is then unconditionally switched from the write start state "WST" to the first write operation state "WRITE1". After the completion of the first write operation, the state of the frame memory 2 is then switched to any of the states "IDLE", "WST", and "WRITE2" in response to the issue of the write and read requests. If none of the requests is issued, the state of the frame memory 2 is switched to the idle state "IDLE" in response to the completion of the first write operation. If the read request is issued during the first write operation, the state of the frame memory 2 is switched to the read start state "RST" to initiate read operation. If the write request is issued without the read request issued, the state of the frame memory 2 is switched to the second write state "WRITE2" to initiate second write operation.

After the completion of the second write operation, the state of the frame memory 2 is then switched to any of the states "IDLE", "WST", and "RST". If the second write operation is completed without the read and write requests issued, the state of the frame memory 2 is switched to the idle state "IDLE". If the read request is issued during the second write operation, the state of the frame memory 2 is switched to the read start state "RST" to initiate read operation. If the write request is issued during the second write operation without the read request issued, the state of the frame memory 2 is switched to the write start state "WST" to initiate first write operation.

FIGS. 8A through 8I are timing charts illustrating read and write operations of sub-field data of a certain pixel line for a certain sub-field, achieved through the state transition illustrated in FIG. 7. The state transition achieves selected one of the following operations: a "discrete" read operation shown in FIG. 8B, a "discrete" write operation shown in FIG. 8C, a write operation after a read operation shown in FIG. 8E, a read operation after a first write operation shown in FIG. 8F, a second write operation after a first write operation shown in FIG. 8H, and a read operation after a second write operation shown in FIG. 8I. The "discrete" read operation designates a read operation after which the state of the frame memory 2 is switched to the idle state "IDLE", while the "discrete" write operation designates a write operation after which the state of the frame memory 2 is switched to the idle state "IDLE".

Referring to FIG. 8B, the "discrete" read operation is initiated in response to the activation of the read request signal 204 with the write request signal 203 deactivated. In response to the activation of the read request signal 204, that is, the issue of the read request, the state of the frame memory 2 is switched to the read start state "RST". This allows the read start pulse signal 205 to be activated, and the read counter 12 to start counting the clock pulses. In response to the read start pulse signal 205 being activated, the state of the frame memory 2 is switched to the read operation state "READ". This allows the read operation to be performed to achieve read-out of sub-field data of a target pixel line for a target sub-field, which includes 4096 (=64× 64) data bits, to be read out from the frame memory 2, which includes a 64-bit output port, while the read counter 12 counts 64 clock pulses denoted by numbers 0 to 63 in FIG. 8B. The frame memory 2 then prepares a following access while the read counter 12 counts the following four "dummy" clock pulses denoted by numbers 64 to 67. Those skilled in the art would appreciate that the number of the dummy clock pulses may be changed.

In response to none of read and write request being additionally issued before the completion of the read operation, the state of the frame memory 2 is switched back to the idle state "IDLE", and the "discrete" read operation is completed.

Referring to FIG. 8C, the "discrete" write operation is initiated in response to the activation of the write request signal 203 with the read request signal 204 deactivated. In response to the activation of the write request signal 203, that is, the issue of the write request, the state of the frame memory 2 is switched to the write start state "WST". This allows the write start pulse signal 20 to be activated, and the write counter 11 to start counting the clock pulses. In response to the write start pulse signal 205 being activated, the state of the frame memory 2 is switched to the first write operation state "WRITE1", and this allows sub-field data of a target pixel line for a target sub-field to be written into the frame memory 2 while the write counter 12 counts 64 clock pulses denoted by numbers 0 to 63 in FIG. 8C. The frame memory 2 then prepares the following access while the write counter 11 counts the following ten "dummy" clock pulses denoted by numbers 64 to 73.

In response to none of read and write request being additionally issued before the completion of the write operation, the state of the frame memory 2 is switched back to the idle state "IDLE", and the "discrete" write operation is completed.

Referring to FIG. 8E, the write operation after the read operation is initiated in response to the activation of the write request signal 203 during the read operation. The read operation is performed while the read counter 12 counts 68 clock pulses, denoted by numbers 0 through 68 in FIG. 8E. In response to the completion of the read operation with the write request signal 203 activated, the state of the frame memory 2 is switched to the write start state "WST". This allows the write start pulse 205 to be activated to switch the state of the frame memory 2 to the first write operation state "WRITE1". The write operation is then performed without the state of the frame memory 2 switched to the idle state "IDLE".

Referring to FIG. 8F, the read operation after the first write operation is initiated in response to the activation of the read request signal 204 during the first write operation. The write operation is performed while the write counter 11 counts 67 clock pulses, denoted by numbers 0 through 66 in FIG. 8F. In response to the completion of the write operation with the read request signal 204 activated, the state of the frame memory 2 is switched to the read start state "RST". This allows the read start pulse 206 to be activated to switch the state of the frame memory 2 to the read operation state "READ". The read operation is then performed without the state of the frame memory 2 switched to the idle state "IDLE".

Referring to FIG. 8H, the second write operation after the first write operation is initiated in response to the activation of the write request signal 203 during the first write operation. The write operation is performed while the write counter 11 counts 67 clock pulses, denoted by numbers 0 through 66 in FIG. 8H. In response to the completion of the first write operation with the write request signal 203 activated, the state of the frame memory 2 is switched to the second write operation state "WRITE2". This state transition allows the second write operation to be successively performed without the state of the frame memory 2 switched to the idle state "IDLE".

When another write operation is issued during the second write operation, the state of the frame memory 2 is switched to the write start state "WST" in response to the completion of the second write operation. This allows the write start pulse signal 206 to be activated to place the frame memory 2 in the first write operation state "WRITE1", and the following requested write operation is then performed. It should be noted the state of the frame memory 2 is not switched to the idle state "IDLE" during this state transition. The direct state transition from the state "WRITE2" to the state "WST" effectively reduces the overhead during the write operation.

Referring to FIG. 8I, the read operation after the second write operation is initiated in response to the activation of the read request signal 204 during the second write operation. The second write operation is performed while the write counter 11 counts 68 clock pulses. The read request issued during the second write operation is ignored before the second write operation is completed. In response to the completion of the second write operation with the read request signal 204 activated, the state of the frame memory 2 is switched to the read start state "RST". This state transition allows the read write operation to be successively performed without the state of the frame memory 2 switched to the idle state "IDLE".

Figure 9:
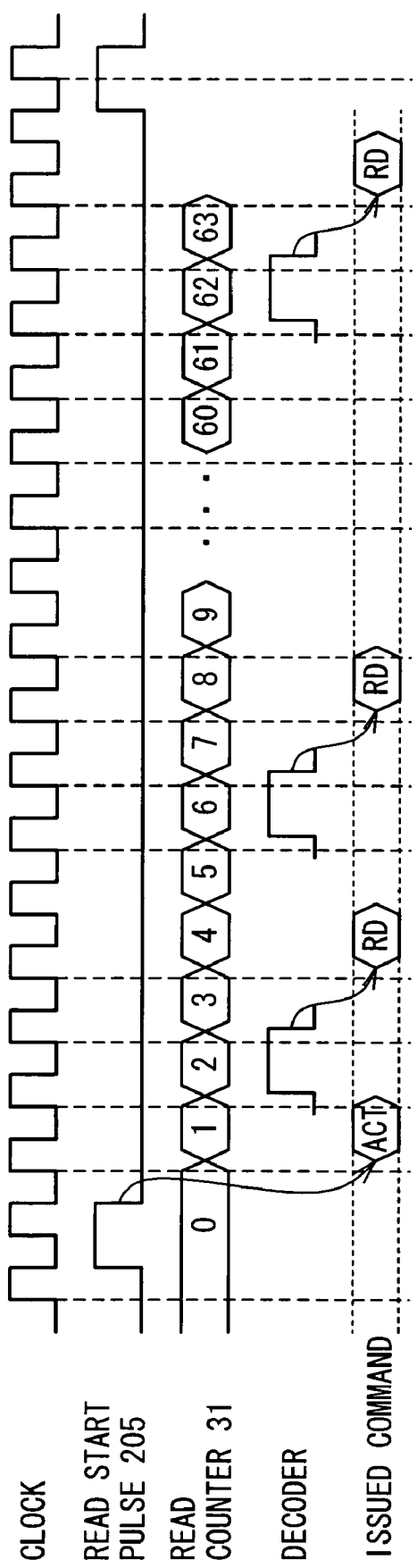
FIG. 9 is a timing chart illustrating a process for issuing commands during a read operation.

FIG. 9 is a timing chart illustrating a process for issuing commands during the read operation. The issue of the commands is synchronous with the clock pulses. In response to the activation of the read start pulse signal 205, the read counter 31 within the read operation controller 30 starts counting the clock pulses. The read counter 31 counts 64 clock pulses until sub-field data of a target line for a target sub-field is completed. A decoder (not shown) within the read operation controller 30 decodes the number of the counts in the read counter 31 to develop the commands 605. The commands 605 typically includes a bank active command (ACT command) and the following read commands (RD commands).

FIG. 9 is a timing chart illustrating a process for issuing commands during the read operation. The issue of the commands is synchronous with the clock pulses. In response to the activation of the read start pulse signal 205, the read counter 31 within the read operation controller 30 starts counting the clock pulses. The read counter 31 counts 64 clock pulses until data read of sub-field data of a target line for a target sub-field is completed. A decoder (not shown) within the read operation controller 30 decodes the number of the counts in the read counter 31 to develop the commands typically including a bank active command (ACT command) and the following read commands (RD commands).

Figure 10:
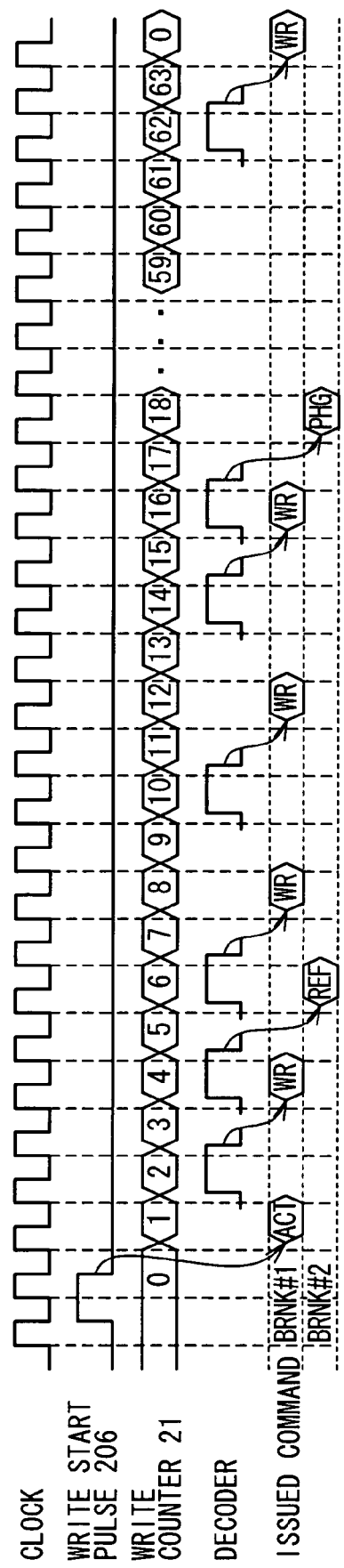
FIG. 10 is a timing chart illustrating a process for issuing commands during a write operation.

FIG. 10 is a timing chart illustrating a process for issuing commands during the write operation. The issue of the commands is synchronous with the clock pulses. In response to the activation of the write start pulse signal 206, the write counter 21 within the write operation controller 20 starts counting the clock pulses. The write counter 31 counts 64 clock pulses until data write of sub-field data of a target line for a target sub-field is completed. A decoder (not shown) within the write operation controller 20 decodes the number of the counts in the write counter 21 to develop the commands, typically including, for the target bank, a bank active command (ACT command) and the following write commands (RD commands), and for the remaining banks, a refresh command (REF command), and a precharge command (PHG command).

In conclusion, the system and method for accessing the frame memory in this embodiment allows the numbers of sub-fields of write and read image data to be independently adjustable, because the frame memory access method is designed to allow one or more write operations to be performed between the adjacent read operations under the control of the state machine 13. This effectively achieves fast write operation to a frame memory through making use of idle time between the adjacent read operations.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. An accessing method of a frame memory integrated within a display panel driver driving a display panel driven by a sub-field addressing method in which one frame of video data is divided into P sub-fields each consisting of N pixel lines and each of said of N pixel lines having a pixel data set, said accessing method comprising:
performing a plurality of write operations for sequentially writing a plurality of pixel data sets into said frame memory such that pixel data sets on m-th line ($1 \leq m \leq N-1$) are sequentially written in order of said P sub-fields from a first sub-field to a last sub-field, and then when a pixel data set at said last sub-field has been written, pixel data sets on (m+1)-th line are sequentially written in order of said P sub-fields from a first sub-field to a last sub-field; and
performing a plurality of read operations for sequentially reading a plurality of pixel data sets from said frame memory such that pixel data sets on q-th sub-field ($1 \leq q \leq P-1$) are sequentially read in order of said N pixel lines from a first pixel line to a last pixel line, and then when a pixel data set at said last pixel line has been read, pixel data sets on (p+1)-th sub-field are sequentially read in order of said N pixel lines from a first pixel line to a last pixel line,
wherein at least two of said write operations are allowed to be performed between adjacent two of said read operations.

2. The method according to claim 1, further comprising:
providing first and second horizontal sync signals,
wherein said write operations for writing said sub-field data of said pixel line for said plurality of sub-fields are performed during a single cycle of said first horizontal sync signal, and
wherein each of said read operations for reading said sub-field data of said pixel line for each of said plurality of sub-fields is performed during a single cycle of said second horizontal sync signal.

3. The method according to claim 1, further comprising:
providing a read request signal activated for requesting said read operations, and
providing a write request signal activated for requesting said write operations,
wherein, in response to activation of said read request signal, associated one of said read operations is performed immediately after said activation of said read request signal when said frame memory is not engaged in write operation, while said associated one of said read operations is performed after completion of associated one of said write operations when said frame memory is engaged in said associated one of said write operations.

4. The method according to claim 3, wherein said read request signal is kept activated until said associated one of said read operations is initiated.

5. The method according to claim 1, further comprising:
providing a read request signal activated for requesting said read operations, and
providing a write request signal activated for requesting said write operations,
wherein, in response to activation of said write request signal, one of said write operations associated with said activation is performed immediately after said activation of said write request signal when said frame memory is not engaged in read nor write operation, said associated one of said write operations is performed after completion of associated one of said read operations when said frame memory is engaged in said associated one of said read operations, and said associated one of said write operations is performed after completion of previous one of said write operations when said frame memory is engaged in said previous one of said write operations.

6. The method according to claim 5, wherein said write request signal is kept activated until said associated one of said write operations is initiated.

7. A memory controller for controlling access to a frame memory integrated within a display panel driver driving a display panel driven by a sub-field addressing method in which one frame of video data is divided into P sub-fields each consisting of N pixel lines and each of said of N pixel lines having a pixel data set, said frame memory being accessed via a plurality of write operations for sequentially writing a plurality of pixel data sets into said frame memory such that pixel data sets on m-th line ($1 \leq m \leq N-1$) are sequentially written in order of said P sub-fields from a first sub-field to a last sub-field, and then when a pixel data set at said last sub-field has been written, pixel data sets on (m+1)-th line are sequentially written in order of said P sub-fields from a first sub-field to a last sub-field, and via a plurality of read operations for sequentially reading a plurality of pixel data sets from said frame memory such that pixel data sets on q-th sub-field ($1 \leq q \leq P-1$) are sequentially read in order of said N pixel lines from a first pixel line to a last pixel line, and then when a pixel data set at said last pixel line has been read, pixel data sets on (p+1)-th sub-field are sequentially read in order of said N pixel lines from a first pixel line to a last pixel line, said memory controller comprising:

a timing controller developing read and write start pulse signals in response to write and read request signals, and a read/write operation control unit responsive to said read and write start pulse signals for initiating read operations for reading sub-field data from said frame memory, and write operations for write sub-field data into said frame memory, wherein said timing controller develops said read and write start pulse signals to allow said read/write operation control unit to initiate at least two of said write operations between adjacent two of said read operations.

8. The memory controller according to claim 7, wherein said timing controller includes:

a state machine switching a state of said frame memory among a plurality of states in response to a reset signal, said write and read request signals, said plurality of states comprising:

an idle state,
a write start state,
a first write operation state, and
a second write operation state, wherein said state machine is designed to switch said state of said frame memory to said idle state in response to activation of said reset signal, to switch said state of said frame memory to said write start state in response to first activation of said write request signal, to unconditionally switch said state of said frame memory to said first write operation state after placing said frame memory in said write start state to initiate one of said write operations, and to switch said state of said frame memory to said second write operation state in response to second activation of said write request signal during said one of said write operations to initiate next one of said write operations.

9. The memory controller according to claim 8, wherein said plurality of states further comprising:

a read start state, and
a read operation state, wherein said state machine is designed to switch said state of said read start state in response to activation of said read request signal when said frame memory is placed in any of said idle state and said first and second write operation states, and to unconditionally switch said state of said frame memory to said read operation state after placing said frame memory in said read start state to initiate one of said read operations.

* * * * *